A. E. COOK.
MOTOR PLOW.
APPLICATION FILED JAN. 24, 1908.
1,071,397. Patented Aug. 26, 1913.
5 SHEETS—SHEET 1.
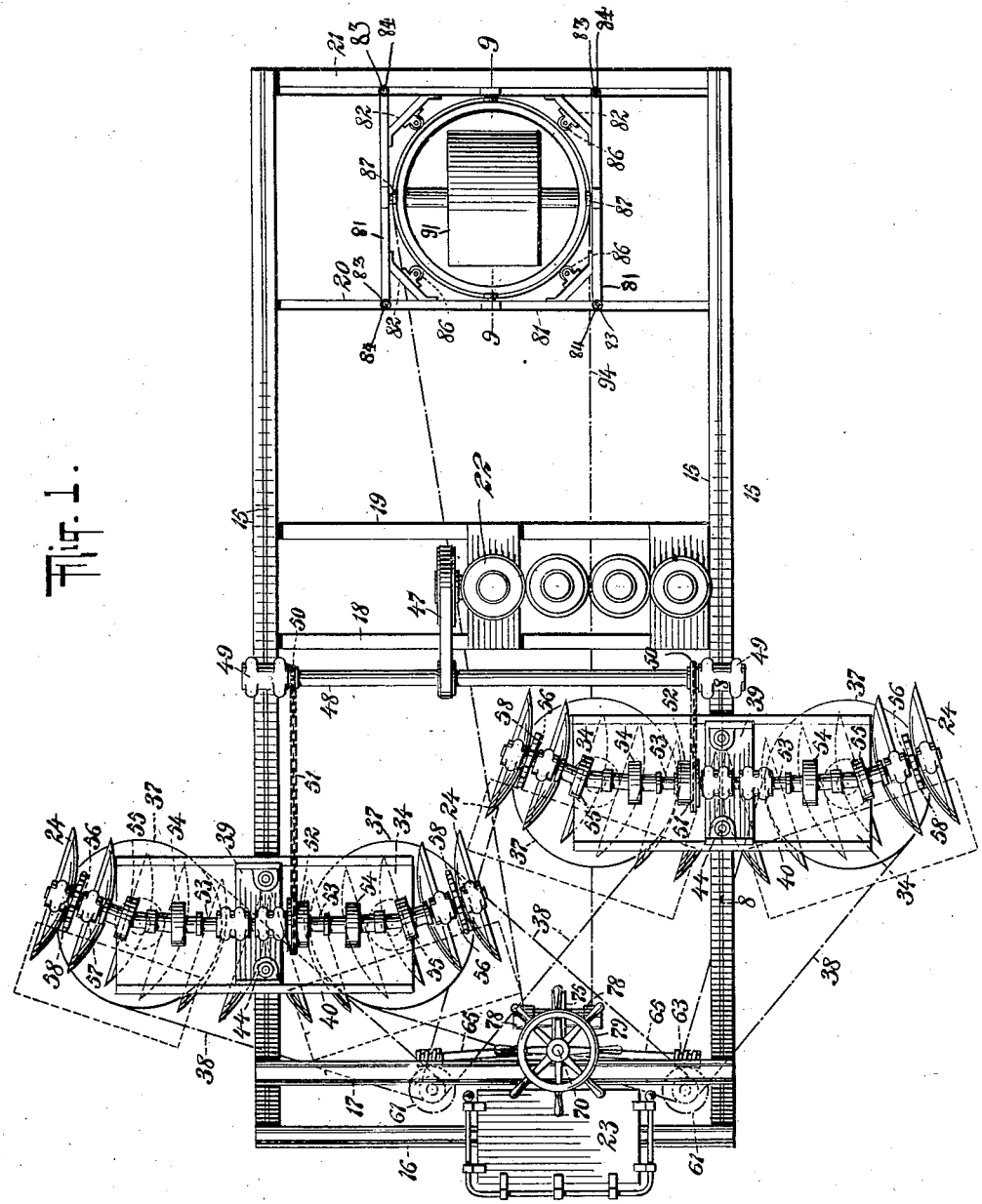
WITNESSES
CJ Horton
E. S. McLaughlin
INVENTOR
Albert E. Cook,
BY
Isaac B. Owens.
ATTORNEY

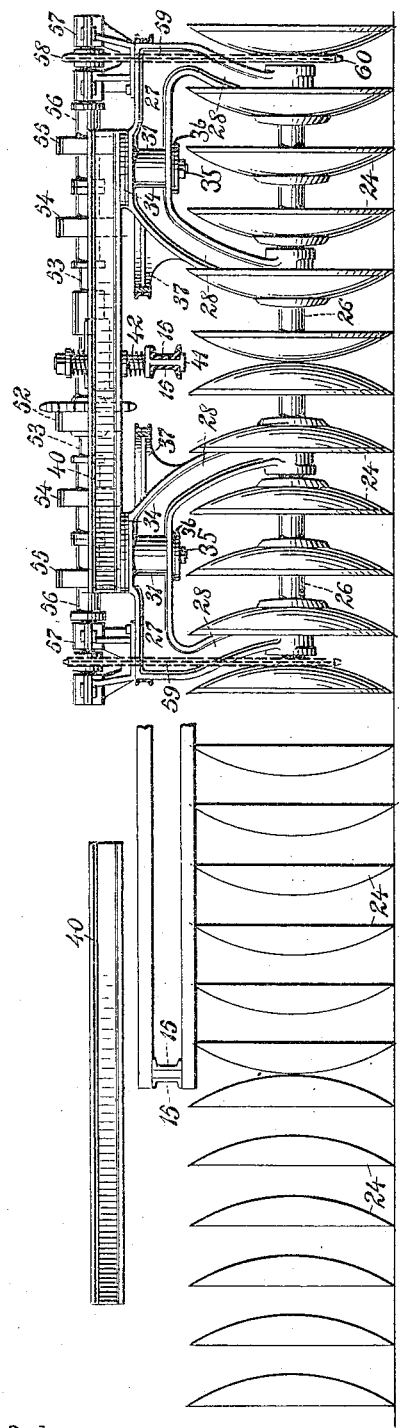

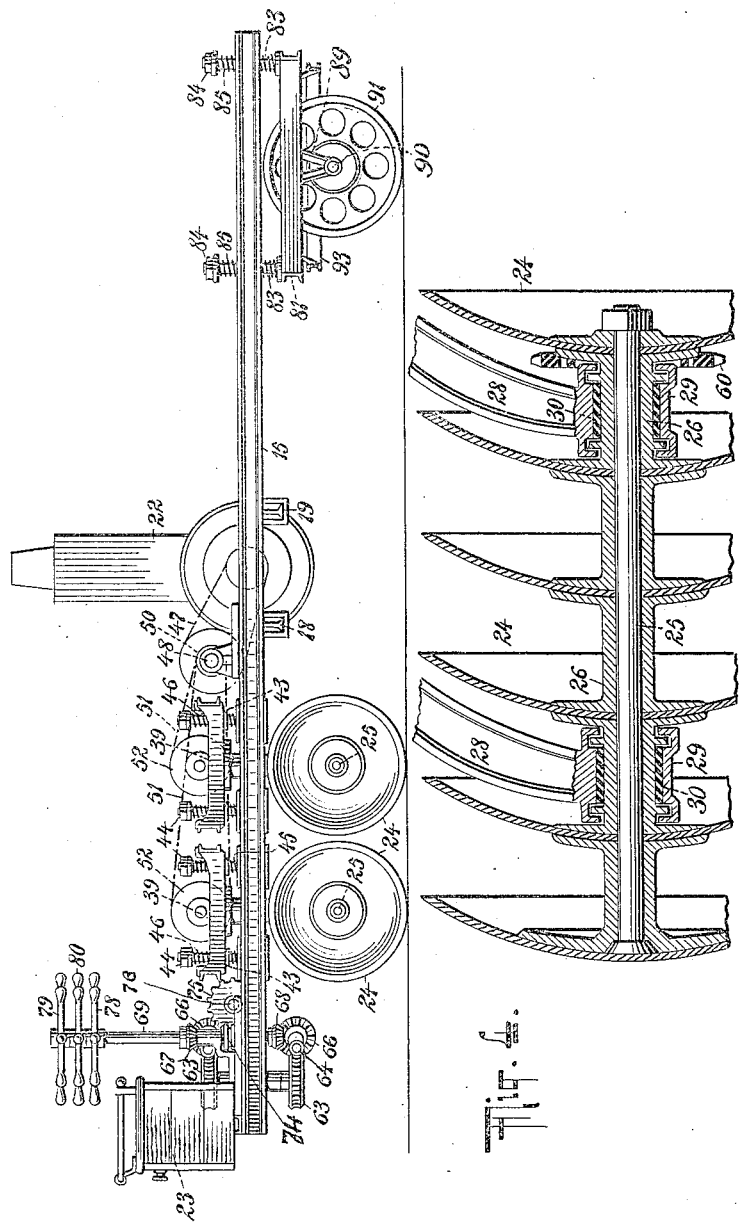

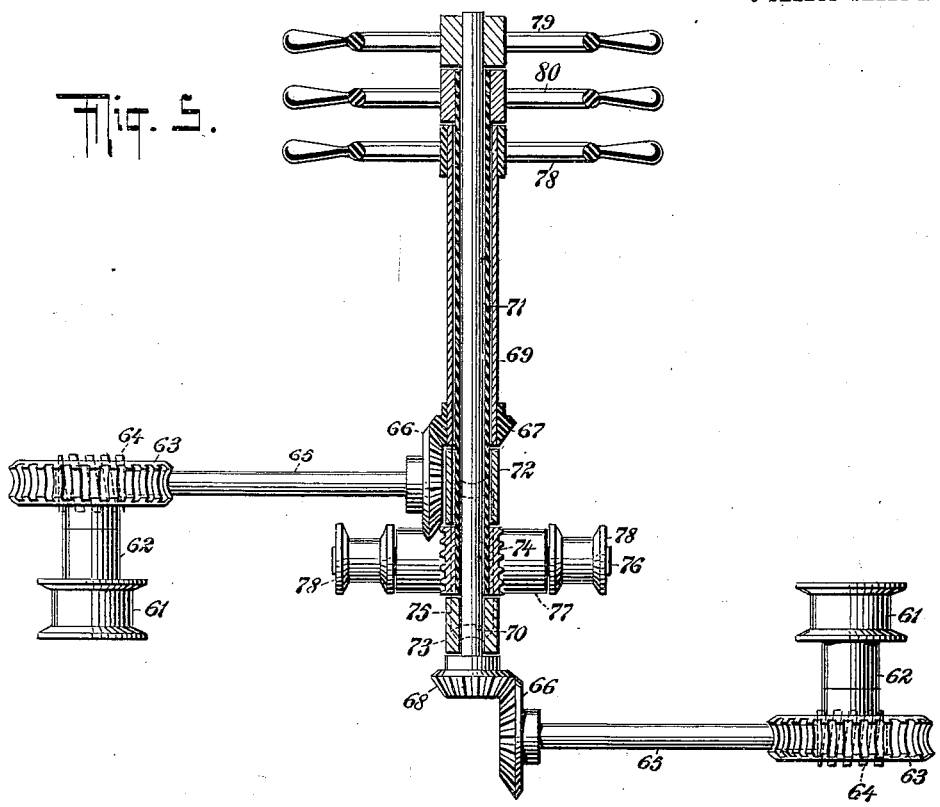
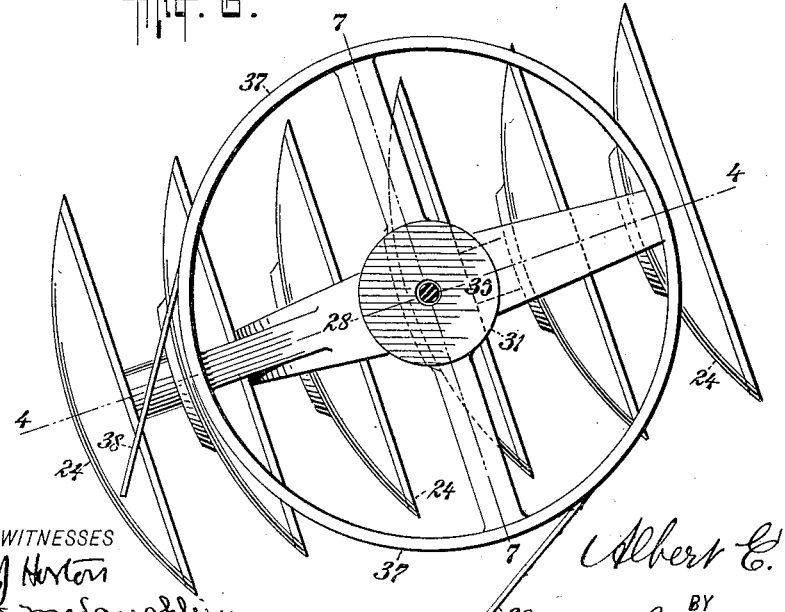

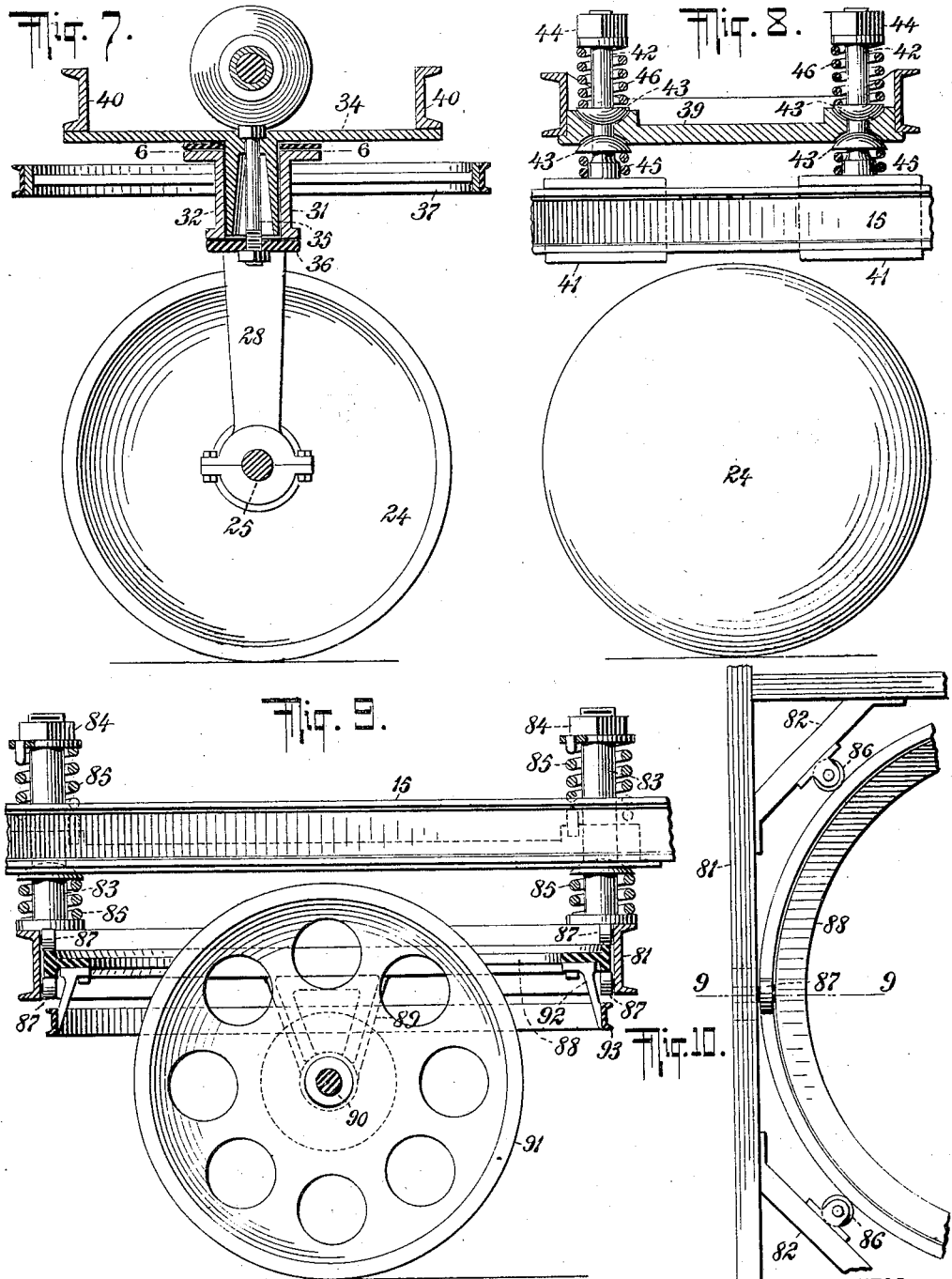

UNITED STATES PATENT OFFICE.

ALBERT E. COOK, OF ODEBOLT, IOWA.

MOTOR-PLOW.

1,071,397. Specification of Letters Patent. Patented Aug. 26, 1913.

Application filed January 24, 1908. Serial No. 412,409.

*To all whom it may concern:*

Be it known that I, ALBERT E. COOK, of the city of Odebolt, Sac county, State of Iowa, have invented certain new and useful Improvements in Motor-Plows, of which the following is a full, clear, and exact specification, such as will enable others skilled in the art to which it appertains to make and use the same.
My invention relates to certain improvements in motor plows of that class in which a frame is sustained by the cultivating or plowing tools and in which a motor mounted on the frame is positively geared or otherwise connected with a part or a whole of such tools so that they act not only to cultivate the earth, but to propel the apparatus.

The object of my present invention is to improve the organization of this type of plow, to simplify its elements and to render it more durable and efficient in operation.

A further object is to so organize the parts that the frame may lie low with respect to the cultivating tools, thus lowering the apparatus as a whole and increasing its stability.

Still a further object is to improve the devices for mounting the frame on the cultivating tools so that the plow may adapt itself to unevenness in the ground with perfect ease of motion.

Still a further object is to improve the devices for steering the plow, avoiding thereby the necessity of frequent and extensive adjustment of the combined cultivating and propelling tools.

I attain these and various other objects, briefly, by providing a frame on which an engine or motor is mounted intermediate its ends. Rearward of the motor are arranged a number of gangs of combined propelling and cultivating tools. These are preferably in the form of rotary disks and each gang is carried on a tool frame which frames are arranged to swing or turn around vertical axes on auxiliary frames which are spring mounted above the main frame. These tools are connected by suitable gearing with the engine and preferably rearward of said propelling and cultivating tools is arranged a gearing in connection with the tool frames so that the inclination of the tool frames to the line of travel of the plow may be varied at will. At the forward portion of the main frame I arrange an auxiliary frame which is below the main frame and spring connected therewith. This auxiliary frame carries a fifth wheel device in which a wheel is arranged. This wheel serves the purpose of steering the apparatus and supporting the front end of the machine and it is connected by a peculiar mechanism with a steering wheel at the rear of the plow. Cultivating disks may be arranged at the front end of the plow if desired, but this is not essential.

My invention involves various other features of importance and all will be fully set forth hereinafter and particularly pointed out in the claims.

Reference is had to the accompanying drawings, which illustrate as an example, one manner in which the various elements of my invention may be embodied, in which drawings, Figure 1 is a plan view of the apparatus showing the parts in detail as fully as the limit to the size of the drawing will admit. Fig. 2 is a partial rear elevation showing two gangs of the combined propelling and cultivating tools and illustrating the manner in which they are mounted on the auxiliary frame, and the particular gearing for transmitting the driving motion to said tools. Fig. 3 is a side elevation of the complete apparatus as shown in Fig. 1; Fig. 4 is an enlarged sectional view on the line 4—4 of Fig. 6, through the axial shaft of one of the gangs of cultivating and propelling tools, particularly illustrating the manner in which they are mounted to rotate on the tool frames Fig. 5 is an enlarged sectional view showing the steering gear and the gearing for adjusting the inclination of the gangs of propelling and cultivating tools to the line of travel of the plow. Fig. 6 is an enlarged plan view of one gang of tools and its tool frame, this view also showing the sheave over which the cable runs for adjusting the gang of tools. Fig. 7 is a cross section on the line 7—7 of Fig. 6 showing the manner in which the tool frames are mounted to turn on the auxiliary frames; Fig. 8 is a detail section on the line 8—8 of Fig. 1 showing the manner in which the auxiliary frames are spring-mounted on the main frame. Fig. 9 is a side elevation with parts in section on the line 9—9 of Fig. 10 showing the fifth wheel device at the front of the machine with the means for spring mounting it on the main frame and indicating the front gang of disks; and Fig. 10 is a fragmentary plan view of these parts.

The main frame is, by preference, constructed rectangular in form and is composed of side members each comprising opposed channel irons 15 rigidly secured to each other but slightly spaced apart as indicated in Figs. 1 and 2. The side members of the frame are connected by transverse members, the specific arrangement of which is not important, but which, according to the construction shown in the drawings, are indicated at 16, 17, 18, 19, 20 and 21. These transverse connecting members are located two adjacent to the front end, two approximately at the middle of the frame and two adjacent to the rear end. The engine or motor which may be of any desired form, is indicated in outline at 22 and is bedded on the cross members 18 and 19. The front cross members 20 and 21 carry the front steering wheel or roller and the rear cross members 16 and 17 carry a seat and tool chest 23 together with the steering and adjusting gear which will hereinafter fully appear.

I will now describe the construction and organization of the gangs of combined cultivating and propelling tools which are arranged at the rear portion of the frame behind the engine 22. As shown best in Fig. 1, there are four gangs of these tools or disks, two gangs arranged at each side of the machine. These tools are indicated at 24. As shown best in Figs. 2 and 4, the rotating disks or cultivating tools of each gang are fastened on axial shafts 25 and interposed between said parts are thimbles 26 which hold the parts 24 and 25 rigid with each other. The tool frames have main or upper portions 27 from which arms 28 project downward. These arms are laterally curved so that they may reach in between the concavo-convex disks without interference therewith and terminate at their lower ends in boxes 29. Suitable bearing bushings or the like indicated at 30, are interposed between the boxes and thimbles to insure free rotation of the disks, axial shaft and thimbles.

Referring now to Figs. 2 and 7, the upper or main part 27 of the tool frames are provided with vertical boxes 31 and in these are received the downwardly extending studs 32 of cross members 34 on the auxiliary frames. 35 indicates a king bolt extending from the auxiliary frame through the stud 32 and engaging a disk or washer 36 on the underside of the box 31 of the tool frame. In this manner the tool frames are mounted to turn around vertical axes, and are sustained on the auxiliary frames. The tool frames are also provided with large sheaves 37 (see Figs. 1, 2, 6 and 7) which are arranged at the level of the upper portions 27 of the tool frames and are adapted to have chains or cables 38 passed around them to adjust the inclination of the gangs of tools as will fully appear hereinafter.

As shown best in Figs. 1, 2, 3, 7, and 8, there are two auxiliary frames at the rear portion of the apparatus which frames are each composed, in addition to the cross members 34 before described (see Figs. 1, 2, and 7), of an intermediate cross member 39 and two side members 40, the side members extending longitudinal of the auxiliary frames and transversely of the apparatus. These frames are located above the main frame and, as shown best in Figs. 2 and 8, are connected thereto by means of blocks 41 which are fastened between the channel irons 15 of the side members of the main frame. From these blocks 41 stout bolts or pins 42 rise. These pins or bolts 42 extend loosely through openings in the central cross members 39 of the auxiliary frames which members are heavily constructed, with openings for the pins 42 sufficiently large to allow perfect ease of movement. Above and below the cross members 39 disks or washers 43 bear and at the upper ends of the pins are located nuts 44. Stout expansive springs 45 bear between the blocks 41 and lower washers 43 and similar springs 46 bear between the nuts 44 and upper washers 43. In this manner the auxiliary frames are spring sustained above and on the main frame and are allowed a wide freedom of movement thereon. At the same time a thorough spring mounting of the frame is effected which makes the apparatus very much easier in operation and prevents racking and jarring the parts supported on the main frame.

From the engine 22 a gear 47 of any suitable sort drives a rotary shaft 48 which is revolubly mounted at its ends in boxes 49 secured to the side members of the main frame. This shaft 48 carries respectively at its end portions, sprockets 50 over which chains 51 pass respectively to differential gears 52. There are two differential gears provided, one for each of the two gangs of cultivating tools at the sides of the machine. Said differential gears may be of the usual or any desired construction and connected with shaft sections 53 rotatably mounted in suitable bearings on the auxiliary frames. The shaft sections 53 are each connected by universal joints 54 and 55 with shaft sections 56 mounted in boxes 57 attached to the upper portions 27 of the tool frames. The universal joints 54 and 55 are so arranged that the universal connection effected by them is vertically coincident with the centers around which the tool frames turn on the auxiliary frames, so that the motion of the tool frames on the auxiliary frames will not interfere with transmision on the shafts 53 and 56, the shafts 56 swinging with the tool frames. Said shafts 56 carry sprockets 58 and these are connected by chains 59 with sprockets 60 secured to one of the thimbles 26 of the disk gangs. From this arrangement it follows that the shaft 48 driven from the engine, drives the differential gears 52 and these gears drive the shaft sections 53 which in turn, through the universal joints 54—55, drive the shaft sections 56, which last shaft sections are geared with the respective gangs of disks. The gangs of disks are thus rotated from the engine irrespective of the adjustment of the tool frames around the vertical axis. The engine, of course, or the gearing driven therefrom, may be provided at any convenient point with a clutch and speed change gear to vary and control the speed at which the disks are driven. The differential gears 52 serve to compensate for the differential motion of the two connected disk gangs which differential motion will be incident to the movement of the disk gangs in arcs of different radii.

Referring to Fig. 1, it will be seen that of the two pairs of disk gangs, the gangs of each pair are disposed at an angle to each other and the left hand and right hand gangs of each pair are in parallelism. To maintain this relative arrangement, the chains or cables 38 of the parallel gangs are cross connected to two drums 61 in the manner shown in Fig. 1 so that when these drums are rotated, equivalent motions will be imparted to each of the parallel gangs, maintaining their characteristic relation. These two drums 61 and the devices for operating them, are best shown in Figs. 1, 3, and 5. Referring particularly to Fig. 5, the shafts of the drums 61 are mounted in boxes 62 attached in any suitable manner to the cross member 17 of the main frame, and carry worm wheels 63, one located above its drum and the other below its drum, and both meshed respectively with worms 64 fastened to shafts 65 also at different elevations. The shafts 65 are rotatably mounted in suitable bearings and carry beveled gears 66 in mesh with bevel gears 67 and 68 secured respectively to a hollow shaft 69 and a solid shaft 70. The hollow shaft 69 receives a second hollow shaft 71 and the hollow shaft 71 in turn receives the solid shaft 70. Boxes 72 and 73 are provided to sustain the inner shafts and said boxes are suitably mounted on the frame in any desired manner. The solid shaft 70 projects below the hollow shaft 71 and the hollow shaft 71 projects below the shaft 69 and box 72. At its lower extremity, the hollow shaft 71 carries a worm 74 which meshes with a worm wheel 75 disposed in a vertical plane and fastened on a horizontal shaft 76 mounted in boxes 77 sustained in any suitable manner on the main frame of the machine. At its ends, the shaft 76 carries drums 78 which are connected with the steering cables as will hereinafter fully appear. These shafts 69, 70 and 71 extend vertically in front of the seat 22 and respectively carry hand wheels 78, 79 and 80 by which they may be independently rotated. With respect, therefore, to the mechanism for adjusting the inclination of the combined cultivating and propelling disks, it will be seen that this may be manually effected by turning the hand wheel 78 and 79 in one direction or the other, thus rotating the drums 61 through the trains of gearing described and turning the tool frames in the direction desired.

At the front of the apparatus, below the main frame, is arranged a rectangular auxiliary frame 81, which is cornered off by braces 82 (see Figs. 1, 9 and 10). This frame is sustained by means of bolts or pins 83 which rise from it and pass loosely through vertical openings in the main frame. The bolts 83 are provided with nuts 84 at their upper ends and, encircling the bolts above and below the main frame, are springs 85 substantially similar to the springs 46 which thus spring-mount the main frame on the auxiliary frame 81. The braces 82 of the auxiliary frame 81 carry guide rollers 86 having vertical axes and the main portions of the auxiliary frame 81 carry pairs of guide rollers 87 having horizontal axes. Between these horizontal and vertical guide rollers 86 and 87 is arranged a fifth wheel or annulus 88 which as shown best in Fig. 9, is T-shaped in section and lies horizontally. This annulus carries depending arms 89 in which is held the axial shaft 90 of the front wheel 91. It will thus be seen that the fifth wheel or annulus 88, with its connected wheel 91, may be turned around a vertical axis and that the fifth wheel is snugly guided in all directions by means of the rollers 86 and 87. It will also be seen that this fifth wheel, supported in the auxiliary frame 81, is yieldingly sustained below the main frame, thus allowing perfect freedom of motion in all directions. Depending from the fifth wheel or annulus 88 are a number of brackets 92 which carry a sheave 93. This sheave encircles the wheel 91 and has a chain or cable 94 turned around it, the ends of which chain or cable extend rearward and are turned around the drums 78 in opposite directions so that by operation of the hand wheel 80, the train of the gearing connecting the same with the drums 78 is operated and the drums 78, pulling and slacking on the ends of the cable 94, adjust the inclination of the wheel 91. This wheel 91 in addition to supporting the front of the apparatus serves also as a steering means. By turning the hand wheel 80, the plow may be moved in any desired direction.

The operation of the apparatus will, it is believed be generally understood from the foregoing. The parts being assembled as shown, and the operation of the engine started, rotation of the rear gang of cultivating and propelling tools will cause said tools to enter the earth and plow the same. At the same time, these tools, acting on crossing lines, engage the earth with a propelling effect and the resultant of the opposing forces sends the plow straight ahead. The plowing action of the disks may be regulated by regulating the inclination of their gangs to each other, causing the disks to enter the ground to a greater or less extent, and to plow with a narrow or wider furrow as desired. The direction or course of the apparatus is controlled by the adjustment of the wheel 91 through the medium of the hand wheel 80 and its connections. The operator, resting on the seat 23, controls the entire operation of the apparatus. The apparatus may also be provided with seeding or planting devices and various other attachments so that it may be made to serve by one operation, to perform a number of operations heretofore performed by separate apparatus. In addition to this, it may be made to carry at its rear, harrow teeth for harrowing the soil and crushing the clods, thus increasing its field of usefulness materially.

It will be observed from the drawings that the members of both pairs of gangs of disks engage their convex faces with each other so that the thrust is balanced between the members of the pairs of disks. The disks in operating have an end thrust owing to the form of the disks and to their inclination to the line of travel and ordinarily would tend to "buckle" the gang of disks, *i. e.* causing one end to sink more deeply into the earth than the other. By engaging the gangs with each other as explained, the thrust is balanced and counteracted and the disks are caused to work evenly in the earth. Further, the strain on the pivotal connections between the teeth and auxiliary frames is relieved and it is made possible to shift and turn the disks more rapidly. In this connection it will be seen that the axle or shaft which mounts the disks is countersunk in the flange to which the end disk is fastened so that the convex side of the disk is unbroken and presents a smooth surface for this end thrust bearing.

Having thus described the invention, what I claim as new and desire to secure by Letters Patent of the United States is:

1. A motor plow comprising a main frame, a transversely disposed frame comprising a member having a vertical opening therein, a stud pin rising from the main frame and passing through the opening, springs surrounding the stud pin above and below the auxiliary frame and disks respectively mounted on the end portions of the auxiliary frame.

2. In a motor plow, the combination of a main frame comprising two beams extending in parallelism, a block fastened between said beams, a stud pin rising from the block, a transversely disposed auxiliary frame having an opening therein through which the stud pin passes loosely, springs surrounding the stud pin above and below the auxiliary frame yieldingly to mount the same and disk gangs mounted on the end portions of the auxiliary frame.

3. A motor plow having a main frame, two transversely disposed auxiliary frames mounted on the main frame, a gang of disks mounted on each end portion of each auxiliary frame, means for positively rotating said disks, a non driven rotary member adjustably mounted on the main frame forward of the auxiliary frames, and means for adjusting said non driven member to steer the plow.

4. A motor plow having a main frame, auxiliary frames mounted thereon, disk gangs, means for mounting the same on the auxiliary frames to enable them to be adjusted around vertical axes, sheave rings in connection with the disk gangs, cables engaged with the sheave rings, drums over which the cables are wound, gearing for driving the drums, concentric shafts respectively connected with the gearings of the drums and means for rotating the shafts to adjust the disk gangs.

5. A motor plow having a longitudinally disposed main frame, two auxiliary frames at the rear portion thereof the auxiliary frames extending transversely and connected with the main frame intermediate the ends of the auxiliary frame, a gang of cultivating and propelling tools mounted on each end of each auxiliary frame, an engine mounted on the main frame, gearing connecting the engine with said gangs of cultivating and propelling tools, a rotary member mounted at the front portion of the main frame and means for adjusting said rotary member to steer the plow.

6. A motor plow having a longitudinally disposed main frame, two auxiliary frames at the rear portion thereof the auxiliary frames extending transversely and connected to each side portion of the main frame intermediate the ends of the auxiliary frames, a combined cultivating and propelling tool mounted at each end of each auxiliary frame, an engine mounted on the main frame, gearing connecting the engine with said tools, and means for supporting the front portion of the main frame.

7. A motor plow having a longitudinally disposed main frame, two auxiliary frames at the rear portion thereof the auxiliary frames extending transversely and connected to each side portion of the main frame intermediate the ends of the auxiliary frames, a combined cultivating and propelling tool mounted at each end of each auxiliary frame, an engine mounted on the main frame, gearing connecting the engine with said tools, means for supporting the front portion of the main frame, such means consisting in a rotary member, and devices for adjusting the same to steer the plow.

8. A motor plow having a longitudinally disposed main frame, two auxiliary frames respectively at the sides of the rear portion thereof, means for yieldingly connecting the auxiliary frames intermediate their ends with the main frame, a combined cultivating and propelling tool mounted on each end portion of each auxiliary frame, a motor mounted on the main frame, gearing connecting the motor with said cultivating and propelling tools, and means for supporting the front portion of the main frame.

9. A motor plow having a longitudinally disposed main frame, two auxiliary frames respectively at the sides of the rear portion thereof, means for yieldingly connecting the auxiliary frames intermediate their ends with the main frame, a combined cultivating and propelling tool mounted on each end portion of each auxiliary frame, a motor mounted on the main frame, gearing connecting the motor with said cultivating and propelling tools, and means for supporting the front portion of the main frame, comprising an adjustable rotary member and devices for adjusting the same to steer the plow.

10. A motor plow having a longitudinally disposed main frame, two auxiliary frames respectively at the sides of the rear portion thereof, means for yieldingly connecting the auxiliary frames intermediate their ends with the main frame, a combined cultivating and propelling tool, mounted on each end portion of each auxiliary frame, a motor mounted on the main frame, gearing connecting the motor with said cultivating and propelling tools, and means for supporting the front portion of the main frame, comprising a rotary member adjustable around a vertical axis, and devices for so adjusting said member to steer the plow.

11. A motor plow having a longitudinally disposed main frame, two auxiliary frames respectively at the sides of the rear portion thereof, means for yieldingly connecting the auxiliary frames intermediate their ends with the main frame, a combined cultivating and propelling tool mounted on each end portion of each auxiliary frame, a motor mounted on the main frame, gearing connecting the motor with said cultivating and propelling tools, and means for supporting the front portion of the main frame, said means for yieldingly mounting the auxiliary frames on the main frame comprising vertical stud pins rising from the main frame and extending loosely through openings in the auxiliary frames and springs engaging the auxiliary frames above and below the same.

12. In a machine of the class described a rotatable gang of propelling and plowing disks, a motor carried thereon and acting to drive the same, and a double opposed spring suspension for the disks adapting the same to yield to conform to uneven surfaces without imparting shock to the motor.

13. A motor plow comprising gangs of plows, a frame, double opposed spring suspensions supporting the frame on the gangs and an engine on the frame connected to drive the gangs of plows.

14. In a plowing machine a main frame, gangs of plowing disks supporting the same, springs interposed above and below the frame to prevent shock to the frame as the gangs plow uneven surfaces and a motor supported on the frame and driving mechanism operated thereby for actuating the gangs of plows.

In testimony whereof I have signed my name to this specification in the presence of two subscribing witnesses.

ALBERT E. COOK.

Witnesses:
 ISAAC B. OWENS,
 E. I. MCLAUGHLIN.